UNITED STATES PATENT OFFICE.

ARTHUR J. MOXHAM, OF NEW YORK, N. Y.

PROCESS OF EXTRACTING IRON FROM ITS ORES.

1,420,129. Specification of Letters Patent. Patented June 20, 1922.

No Drawing. Original application filed April 5, 1919, Serial No. 287,861. Divided and this application filed April 5, 1919. Serial No. 287,862.

*To all whom it may concern:-*

Be it known that I, ARTHUR J. MOXHAM, a subject of the King of Great Britain, residing at New York city, county of New York, and State of New York, have invented a new and useful Improvement in Processes of Extracting Iron from Its Ores, of which the following is a full, clear, and exact description.

In an application filed April 5, 1919, Serial No. 287,861, of which this application is a division, I set forth several specific processes for winning iron direct from the ore by electrolysis, all having certain features in common, but each having features of independent value and importance. The subject-matter of the present application is one of said processes, the special advantages of which will be developed in the course of the present description.

I first treat the ore with a sufficient quantity of acid to dissolve the metallic ingredients of the ore. Preferably, in dissolving iron ore, I use hydrochloric acid, which dissolves out the metal with great efficiency and with a clean product resulting. If time be of importance, the application of heat will cause the ore to dissolve quite rapidly.

After the ore is dissolved, I separate the metallic constituents, now in solution, from the insoluble gangue by draining off the solution, which is largely ferric chloride.

After long continued draining as much as 8 to 10 per cent of the solution will still adhere to the residue. I remove the adherent solution in one of the two following ways.

I wash the residue with water, which is a solvent of the solution, thereby diluting the solution. The dilute solution which drains off may be added to the strong solution first drained off or may be treated separately. Dilution and replacement are best effected while agitating either the ore, or the water, or both. By this means the iron solution held by the residue is so diluted with water that the loss by waste of the solution will be reduced to only a few pounds per ton of residue.

As an alternative, the residue may be treated with concentrated sulfuric acid, thus driving off the hydrochloric acid in the adherent solution and converting the iron present into ferric sulfate, which is soluble in water. The hydrochloric acid, set free as a gas, can be absorbed in water for use in treating fresh quantities of ore. The ore is then washed with water to dilute any carry off most of the iron sulfate adhering to the residue. Ferric sulfate being cheaper than ferric chloride, any slight waste that may occur will cost less.

To the ferric chloride drained off as above, I also add concentrated sulfuric acid, thus setting free the hydrochloric acid gas and forming ferric sulfate. As well known in the art, the reaction may be facilitated and time saved by the application of heat. The gaseous hydrochloric acid driven off can be reclaimed. The precipitated ferric sulfate thus formed is dissolved in water and conducted to a suitable storage receptacle for delivery to an electrolytic chamber or cell. While the solution is composed mainly of ferric sulfate, it will contain also relatively small quantities of other sulfates, varying according to the composition of the ore.

The solution, for purposes of electrolysis, is nearly, if not quite, as pure as ordinary commercial iron, but as it is now in the form of a solution, it can be, before electrolysis, further purified cheaply by precipitating any of the undesired ingredients. As none of the reagents or acids are lost, it will be economical, in many cases, to even purify pig metal and use the same by dissolving the metallic contents in acid and so eliminating largely or entirely its carbon contents.

After the solution is conducted to the electrolytic cell or chamber and the proper ingredients are added to make the electrolyte, it is subjected to electrolysis by the usual method. An insoluble anode is used, preferably of carbon, and an iron cathode. As a result, chemically pure iron will be deposited on the cathode.

When, however, the iron is deposited on the cathode, it sets free a molecular equivalent of sulphuric acid, which will tend to redissolve the iron as it is deposited and thus nullify the action of the current. I meet this condition by providing a proper base to combine with the free acid as it is formed, which base will either make the salt produced a salable salt or one that can be used over again in the process. To illustrate the difference in the matter of salability, either sodium or ammonia would answer for the base so far as concerns neutralizing the free acid and permitting the deposit to continue. With sodium, however, the result would be sodium sulfate, which is not marketable; but with ammonia, the result would be ammonium sulfate, which is salable in unlimited quantities.

Such a base should be preferably introduced in admixture as a salt, that is, a combination of a base with one of the weak or non-active acids. For example, I may use oxalate, acetate, citrate, or tartrate of ammonia, because oxalic, citric, or tartaric acids are acids which, being more or less non-active, readily yield to replacement by other stronger acids, and being weak themselves, their action on the iron of the cathode is negligible when they are set free. Therefore, with the use of a base (such as ammonia) combined with any of these non-active acids, the more active sulfuric acid will seize and combine with the ammonium base and in turn set free the corresponding quantity of weaker or more passive acid that has been used in making the salt. Such weak acids as those which result, for example, oxalic, citric, or tartaric acids, will not neutralize or block the action of the current by dissolving the metal as fast as it is deposited; and therefore the electrolytic deposition of the iron will continue. After the iron is deposited, there will remain in the solution ammonium sulfate and the weak free acid. I separate the two from each other, or from the electrolyte if necessary, by evaporation and crystallization. The separation can be easily carried out, because there exists sufficient difference in the solubility of ammonium sulfate and the weak acids to make the separation effective.

While I prefer adding the base ammonia as a salt, in the manner described, it is nevertheless possible to add the base in the form of ammoniacal liquor, or even as a gas; adjusting the amount delivered to suit the reaction which sets free the acid. In this case the non-active acid is not present.

In the execution of the entire process, as above described, certain materials have been utilized and certain materials obtained, without substantial waste. Thus, there have been furnished: (1) iron in the shape of ore; (2) hydrochloric acid; (3) either the ammonium salt or the ammoniacal liquor: (4) sulfuric acid. There have been obtained: (1) chemically pure iron; (2) ammonium sulfate. There remain available for re-use: (1) the hydrochloric acid; (2) the weak acid, if such has been used. In other words, the hydrochloric acid and the weak acid, if used, are reclaimed, the metallic ingredients are separated and purified, and the ammonia and the sulfuric acid can be sold at a profit when combined as ammonium sulfate. There is, therefore, practically no waste of material, while there is a gain in value, as the result of the process.

Having now fully described my invention, what I claim and desire to protect by Letters Patent is:

1. The process of extracting iron from its ore which comprises dissolving out the iron with hydrochloric acid, adding sulfuric acid to set free the hydrochloric acid so combined with the iron and form iron sulfate in such manner that the hydrochloric acid set free is adapted for reuse, and separating the iron from the iron sulfate by electrolysis.

2. The process of extracting iron from its ore which comprises treating the ore with hydrochloric acid, draining off the solution thus formed, treating the residue with sulfuric acid to drive off the hydrochloric acid from the solution adhering to the residue and form therefrom iron sulfate, whereby a maximum utilizable yield of hydrochloric acid and iron sulfate may be obtained, and separating the iron from the iron sulfate by electrolysis.

3. The process of extracting iron from its ore which comprises treating the ore with hydrochloric acid, draining off the solution thus formed, treating both the solution and the residue with sulfuric acid to drive off the hydrochloric acid and form iron sulfate, whereby a maximum utilizable yield of hydrochloric acid and iron sulfate may be obtained, and separating the iron from the iron sulfate by electrolysis.

4. The process of extracting iron from its ore which comprises dissolving out the iron with hydrochloric acid, adding sulfuric acid to set free the hydrochloric acid from the solution thus formed and form iron sulfate, separating the iron from the iron sulfate by electrolysis, and causing the sulfuric acid that is set free as the iron is separated to combine during the process of electrolysis with a base other than the iron, thereby preventing redissolution of the iron by the acid.

5. The process of extracting iron from its ore which comprises dissolving out the iron with hydrochloric acid, adding sulfuric acid whereby the same may be reused to set free the hydrochloric acid, separating the iron from the iron sulfate thus formed by electrolysis, and re-using such hydrochloric acid set free as aforesaid to dissolve out fresh quantities of the ore.

6. The process of extracting iron from its ore which comprises dissolving out the iron with hydrochrolic acid, adding sulfuric acid to set free the hydrochloric acid and form iron sulfate, separating the iron from the iron sulfate by electrolysis, adding to the electrolyte a salt formed of a base combined with an acid relatively inactive with iron and adapted to be displaced by the sulfuric acid that is set free as the iron separates, and separating from the inactive acid the sulfate thus formed.

7. The process of extracting iron from its ore which comprises dissolving out the iron with hydrochloric acid, adding sulfuric acid to set free the hydrochloric acid and form iron sulfate, separating the iron from the iron sulfate by electrolysis, and causing the sulfuric acid that is set free as the iron separates to combine with ammonia during the process of electrolysis to form ammonium sulfate.

8. The process of extracting iron from its ore which comprises dissolving out the iron with hydrochloric acid, adding sulfuric acid to set free the hydrochloric acid and form iron sulfate, separating the iron from the sulfate by electrolysis, adding to the electrolyte an ammonium salt the acid constituent of which is relatively inactive with iron, whereby the sulfuric acid that is set free as the iron is deposited combines with the ammonium to form ammonium sulfate, and separating the ammonium sulfate from the displaced inactive acid by crystallization.

In testimony of which invention, I have hereunto set my hand, at New York city, N. Y., on this 3rd day of April, 1919.

ARTHUR J. MOXHAM.